Sept. 27, 1966    C. L. COATES, JR., ETAL    3,275,812
THRESHOLD GATE ADDER FOR MINIMIZING CARRY PROPAGATION
Filed July 29, 1963    8 Sheets-Sheet 1

Inventors:
Clarence L. Coates Jr.,
Philip M. Lewis II.,
by John P. Dellett
Their Attorney.

Inventors:
Clarence L. Coates Jr,
Philip M. Lewis II,
by John P. Dellitt
Their Attorney.

Sept. 27, 1966 C. L. COATES, JR., ETAL 3,275,812
THRESHOLD GATE ADDER FOR MINIMIZING CARRY PROPAGATION
Filed July 29, 1963 8 Sheets-Sheet 4

Inventors:
Clarence L. Coates Jr.,
Philip M. Lewis II.,
by John P. Dellitt
Their Attorney.

Inventors:
Clarence L. Coates Jr.,
Philip M. Lewis II.,
by John P. Dellitt
Their Attorney.

United States Patent Office 3,275,812
Patented Sept. 27, 1966

3,275,812
THRESHOLD GATE ADDER FOR MINIMIZING CARRY PROPAGATION
Clarence L. Coates, Jr., Scotia, and Philip M. Lewis II, Schenectady, N.Y., assignors to General Electric Company, a corporation of New York
Filed July 29, 1963, Ser. No. 298,240
13 Claims. (Cl. 235—173)

This invention relates to a parallel adding circuit comprising a novel arrangement of threshold gates and particularly to such a circuit wherein carry propagation time is eliminated between selected adder stages.

Computer adder circuits may be divided into two general categories, serial adders and parallel adders. In the serial adder the digits of two numbers are added successively starting from the lowest order digit, that is substantially in the same manner two numbers may be added in longhand. Thus, if a column of numbers produces a carry, this carry is then added to the next column.

In parallel adders, all pairs of digits of two numbers to be added are desirably added substantially at the same time in separate adder stages. The parallel adder quite apparently should be many times more rapid in its operation than the serial adder. However, operation of a parallel adder is slowed inasmuch as the carry from a previous column must still be made available before any two digits are added. Therefore carry signals are conventionally propagated along a parallel adder from the lowest order stage to the highest order stage before the sum is correctly completed.

It is theoretically possible to speed the operation of parallel adders by computing a plurality of carries simultaneously, independently from one another. However, conventional adder circuitry including "and"-gate and "or"-gate binary logic does not lend itself to simultaneous carry computation. The number of "and" or "or" gates required for independently computing a carry for each stage, i.e. without benefit of a carry derived from the previous stage, increases quite drastically for each successive stage causing such a mechanization to become quite impractical.

It is therefore a principal object of the present invention to provide an improved and practical fast adder wherein the total time for carry propagation is substantially reduced or minimized.

The present invention utilizes threshold logical elements in circuitry minimizing or avoiding continuous propagation of the carry. According to the circuit of the present invention, threshold logical elements or gates are combined in groups, each producing carries for a parallel sum without the necessity of awaiting a propagated carry within the same group. Carries are computed simultaneously at each stage within the group.

Within a given group of threshold elements, a given threshold element for determining a carry in the $i$th order digit position, rather than being dependent upon a prior propagated carry, instead receives weighted parallel inputs including the pair of $i$th digits being summed. The carry gate also receives at least one next lower order pair of digits as inputs, but the $i$th order digits receive greater weight at the carry gate input.

In this manner a fast adder is implemented which does not propagate a carry throughout an adder network, but only between certain groupings of stages, thereby more nearly approaching fast parallel adder opration. Moreover, the adder circuitry according to the present invention is easily realizable in a practical sense inasmuch as the number of components incorporated in each threshold gate is not materially increased as a result of non-propagation of a carry.

The subject matter which we regard as our invention is particularly pointed out and distinctly claimed in the concluding portion of this specification. The invention, however, both as to organization and method of operation, together with further objects and advantages thereof, may best be understood by reference to the following description take in connection with the accompanying drawings wherein like reference characters refer to like elements and in which:

Figure 4:
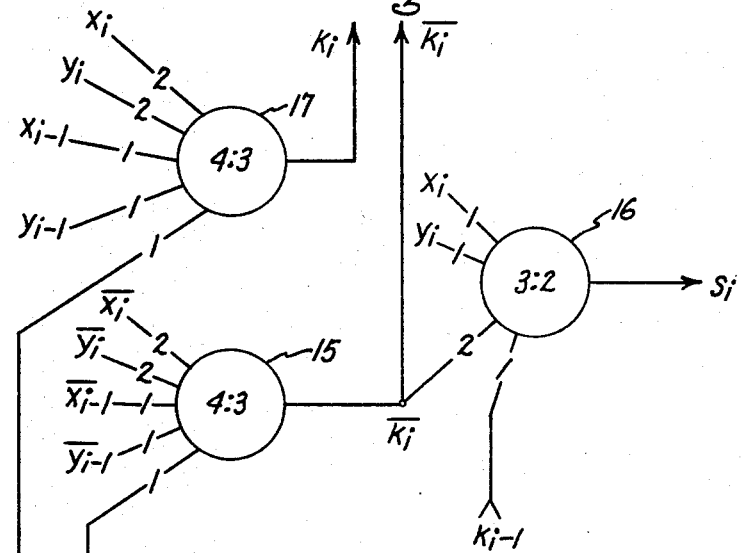
Figure 5:
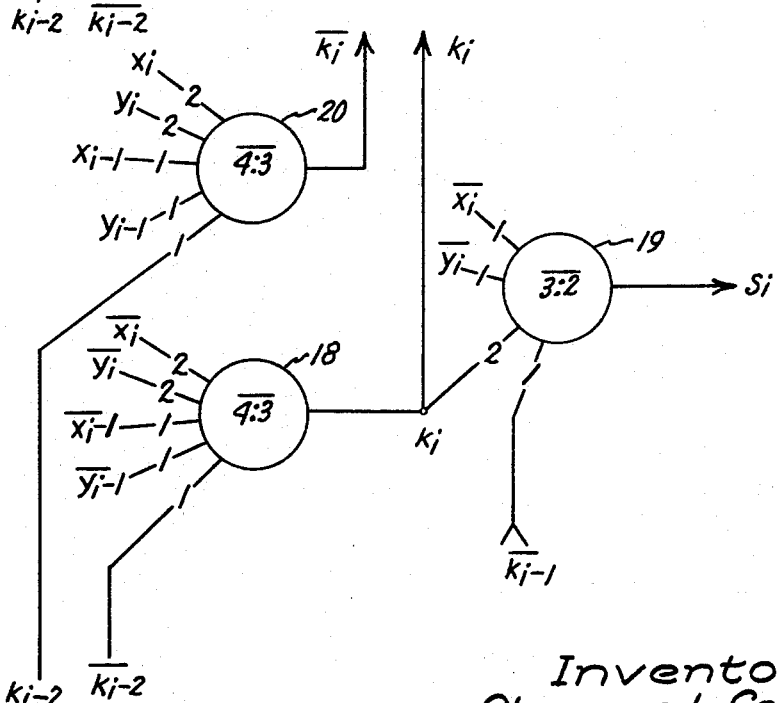
Figure 6:
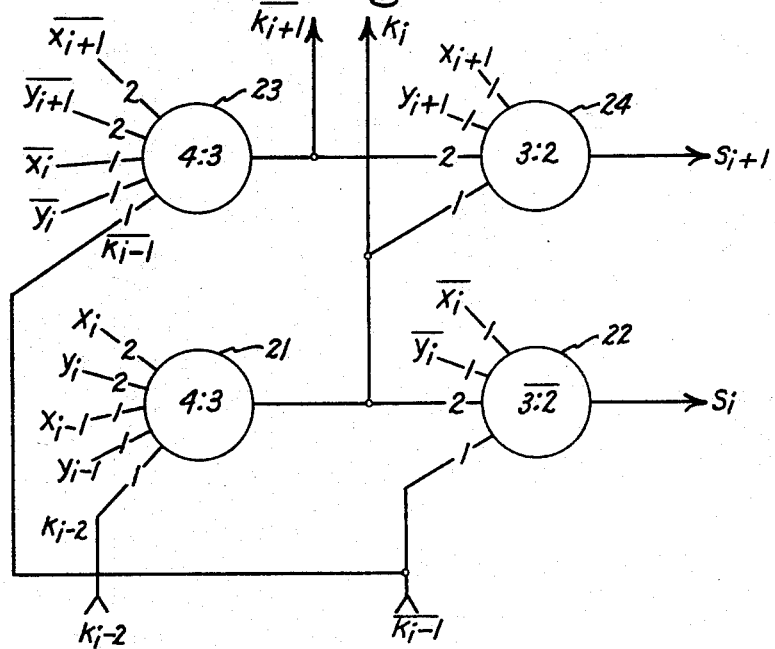
Figure 7:
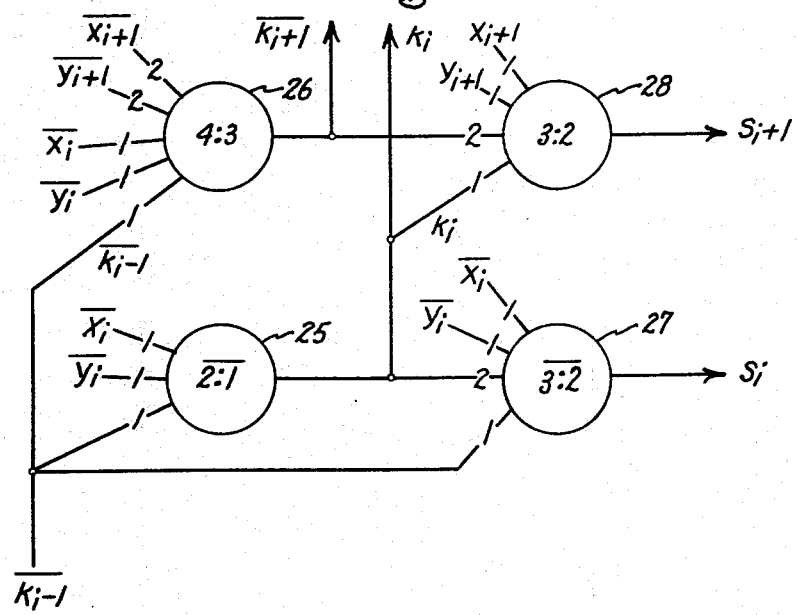
Figure 8:
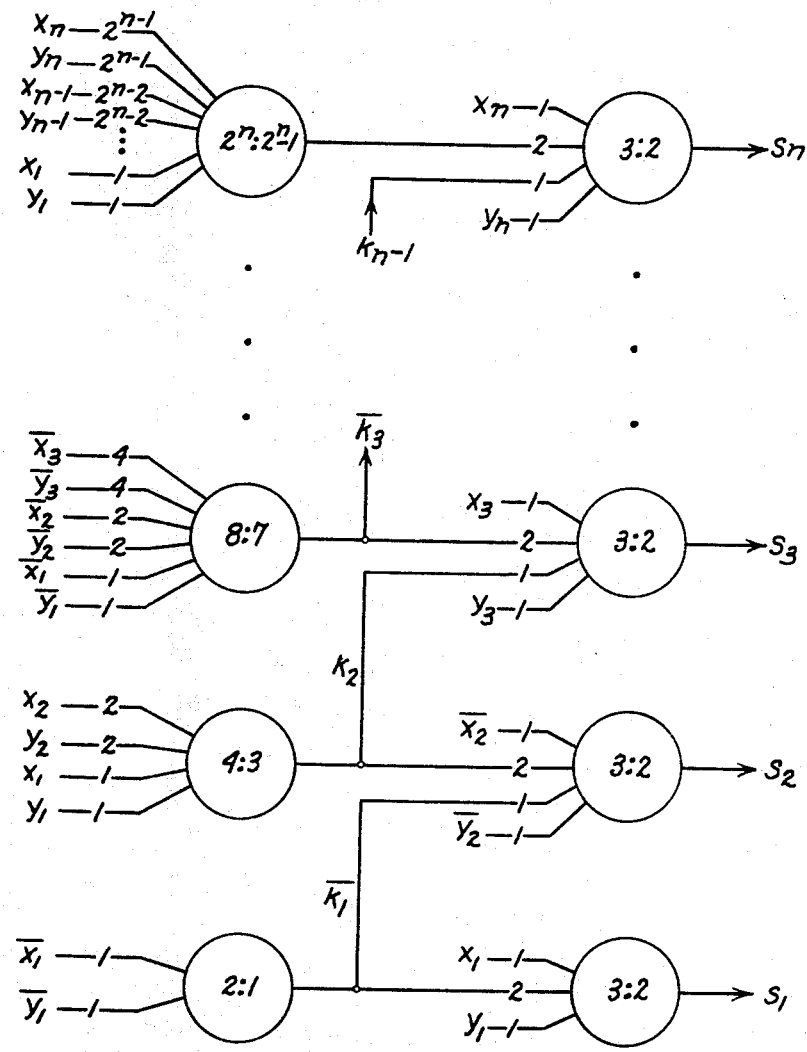
Figure 9:
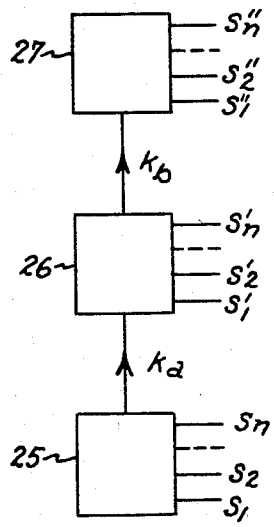
Figure 10:
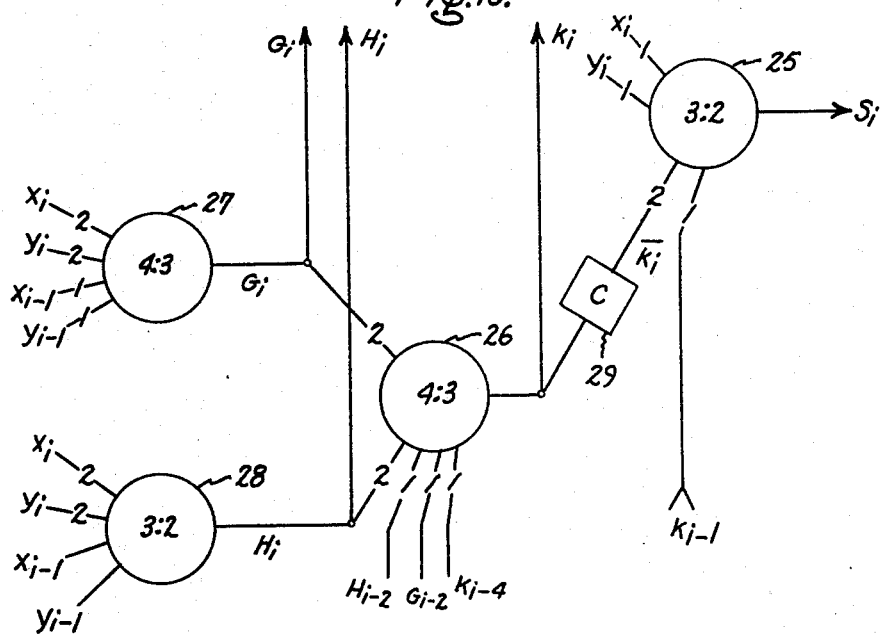
Figure 11:
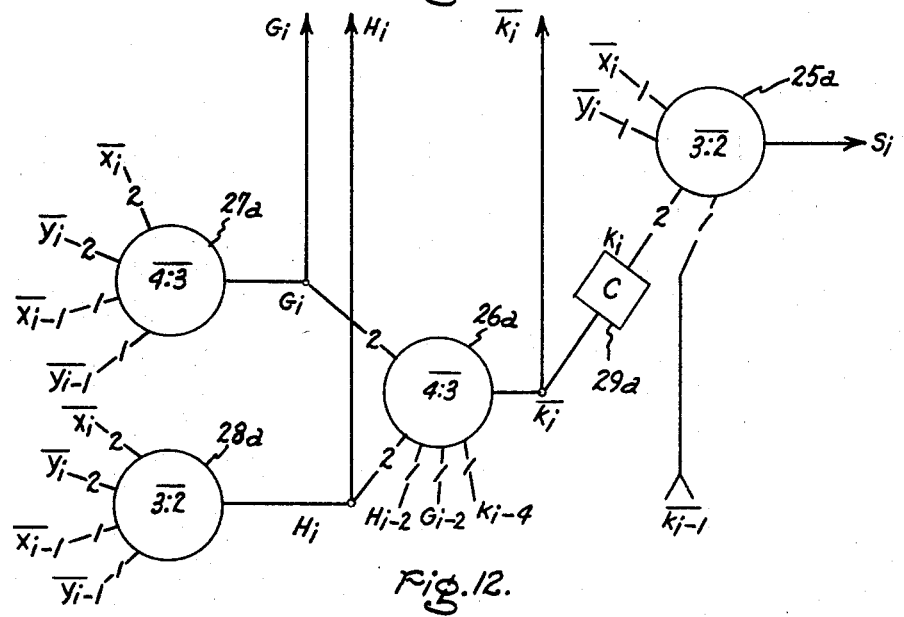
Figure 12:
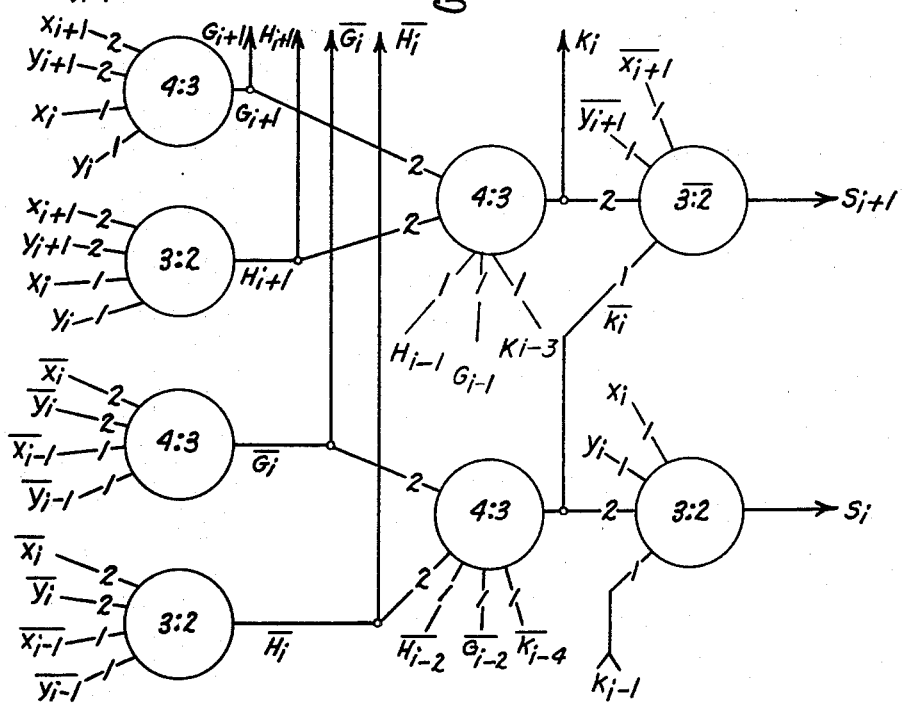
Figure 13:
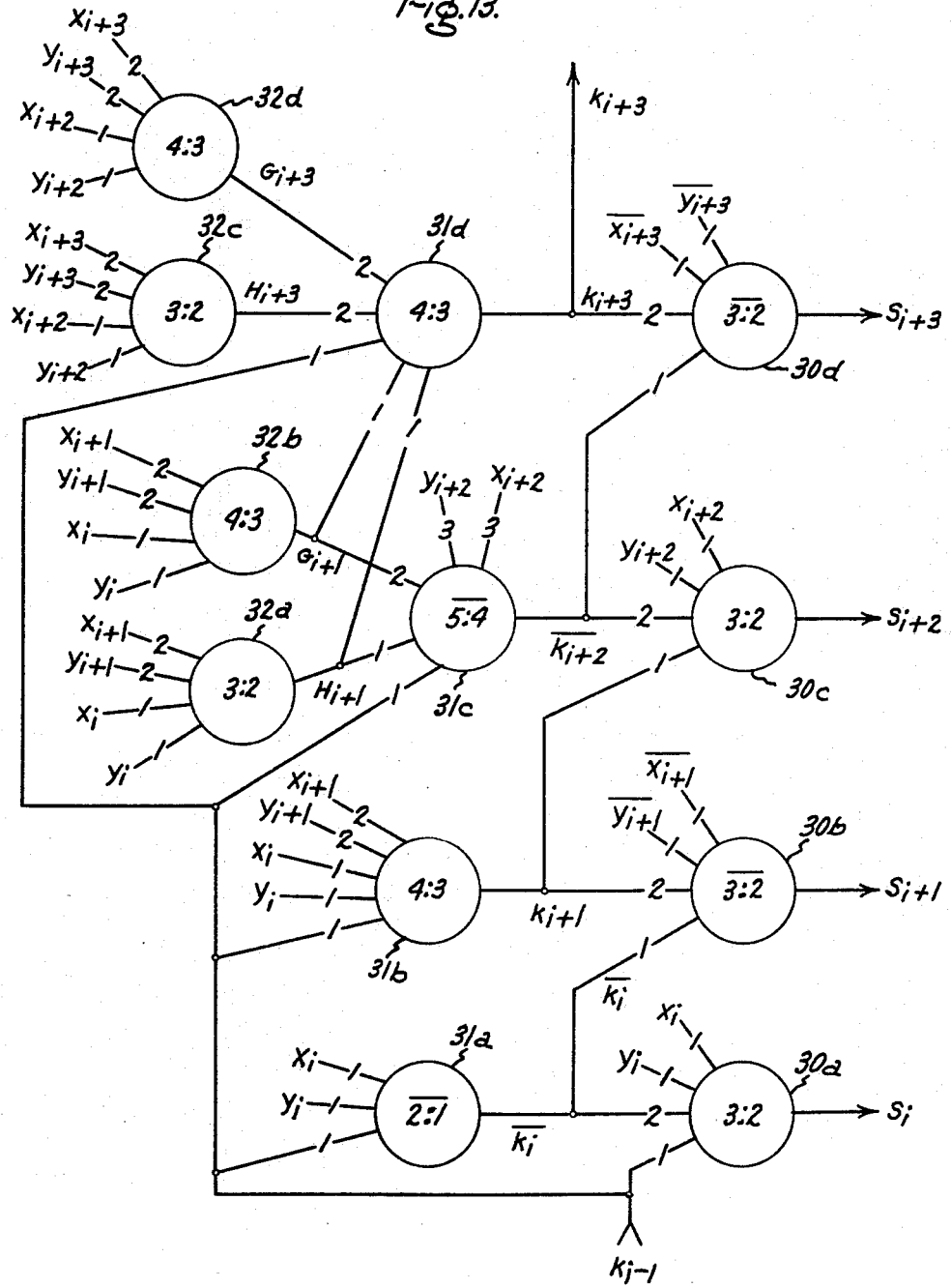
Figure 14:
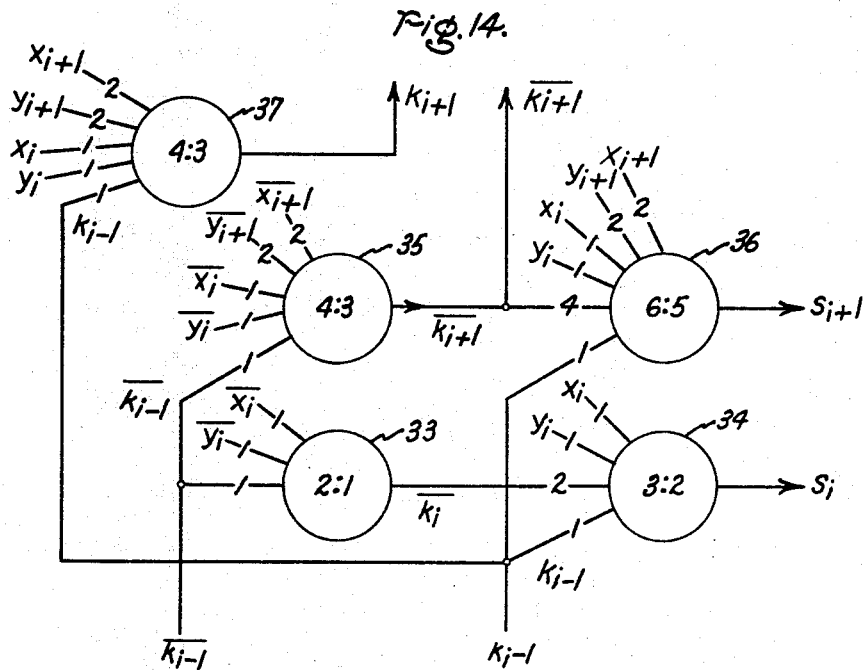
Figure 15:
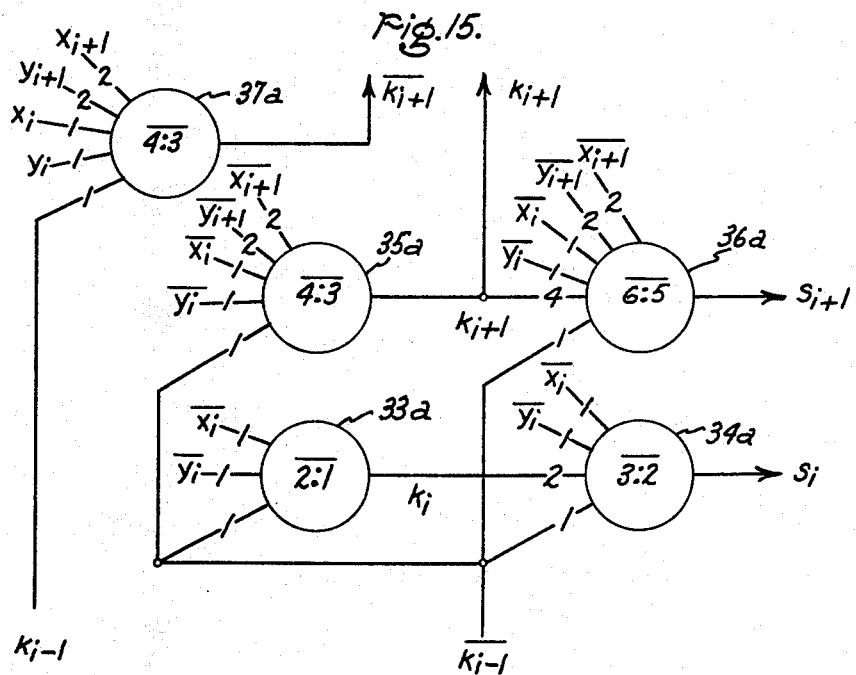

FIG. 4 is a schematic diagram of an adder stage in accordance with the present invention employing non-complementing threshold gate elements, FIG. 5 is a schematic diagram of an adder stage in accordance with the present invention employing complementing gate elements, FIG. 6 is a schematic diagram of two adder stages employing both complementing and non-complementing gate elements, FIG. 7 is a schematic diagram of a variation of the FIG. 6 type of circuit, FIG. 8 is a schematic diagram in generalized form illustrating a plurality of adder stages in one grouping in accordance with the present invention, FIG. 9 is a block diagram schematically illustrating several adder groupings coupled together to form an adder circuit, FIG. 10 is a schematic diagram of a stage of an adder circuit in accordance with the present invention, being one stage of a four-stage grouping, wherein carry threshold gate tolerances are improved by employing a plurality of threshold gates in each stage, this circuit employing non-complementing threshold gates, FIG. 11 is a schematic diagram of a stage of an adder circuit in accordance with the present invention being one stage of a four-stage grouping, wherein carry threshold gate tolerances are improved by employing a plurality of threshold gates in each stage, this circuit employing complementing threshold gates, FIG. 12 is a schematic diagram of a stage of an adder circuit in accordance with the present invention being one stage of a four stage grouping, wherein carry threshold gate tolerances are improved by employing a plurality of threshold gates in each stage, this circuit employing both complementing and non-complementing gates, FIG. 13 is a schematic diagram of an adder circuit in accordance with the present invention comprising a combination of several previous circuit features, FIG. 14 is a schematic diagram of two stages of an adder circuit in accordance with the present invention, which may comprise a grouping, employing a minimum number of all non-complementing threshold gates, and FIG. 15 is a schematic diagram of two stages of an adder circuit in accordance with the present invention, which may comprise a grouping, employing all complementing threshold gates.

Figure 1:
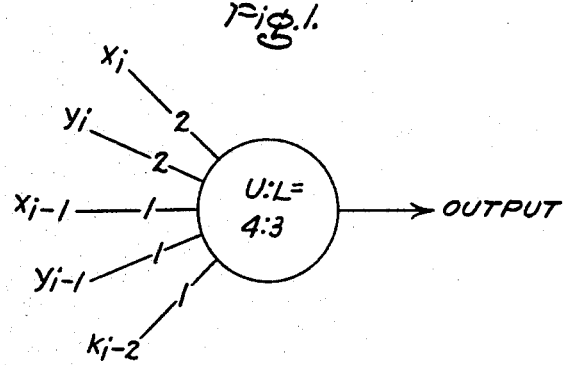
FIG. 1 is a basic representation of a threshold gate element.

A threshold element as utilized in accord with the present invention produces a binary one output when a function of its plurality of the indicated binary inputs exceeds a preset threshold value. Such a threshold element or gate may be represented as in FIG. 1 by a circle enclosing a ratio, $U:L$, of numbers which indicates the threshold "gap." The actual value of threshold is advantageously set to be within this gap. For the threshold element as illustrated in FIG. 1, having a "gap" equalling 4:3, four or more inputs of value one are required to produce an output, but three such inputs produce no output. Weights are given the inputs as indicated by numbers included in the input leads. A weight of two doubles the input so it has the same effect as two inputs of unity weight. Therefore, one input of weight two, plus two inputs of weight one, will operate the gate.

In the gap ratio, the first number, U, is the smallest value of the summation of weighted inputs, $\Sigma a_i x_i$, for which $\Sigma a_i x_i$ exceeds the gate threshold, and L is the largest value for which $\Sigma a_i x_i$ is below the threshold. In the expression, $\Sigma a_i x_i$, $x_i$ indicates an input in the $i^{th}$ order digit position, and $a_i$ indicates the weight applied to such input. The tolerance or allowable variation in component values (and threshold value) is related to the gap, and can be shown to equal $U-L/U+L$. It is apparent that a smaller gap results in a smaller or tighter tolerance in component values.

Figure 2:
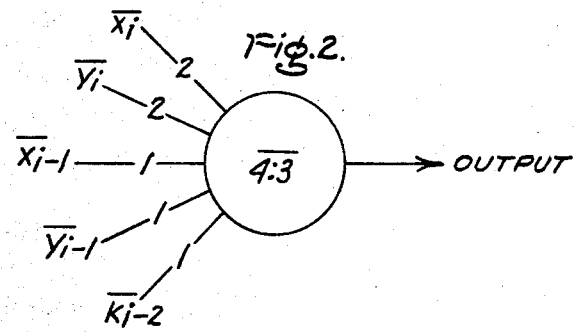
FIG. 2 is a basic representation of a complementing threshold gate element.

FIG. 1 illustrates a straight non-complementing gate. FIG. 2 illustrates an equivalent complementing gate indicated by the bar over the gap numerals. When the sum of the inputs, $\Sigma a_i x_i$, applied to this gate exceed the threshold, the normally-on output of the gate is interrupted. Thus, an inverse output is produced. In the FIG. 2 illustration, the inputs are also shown as complements. That is, an input signal current is applied to the particular input lead in the absence of the quantity given.

Figure 3:
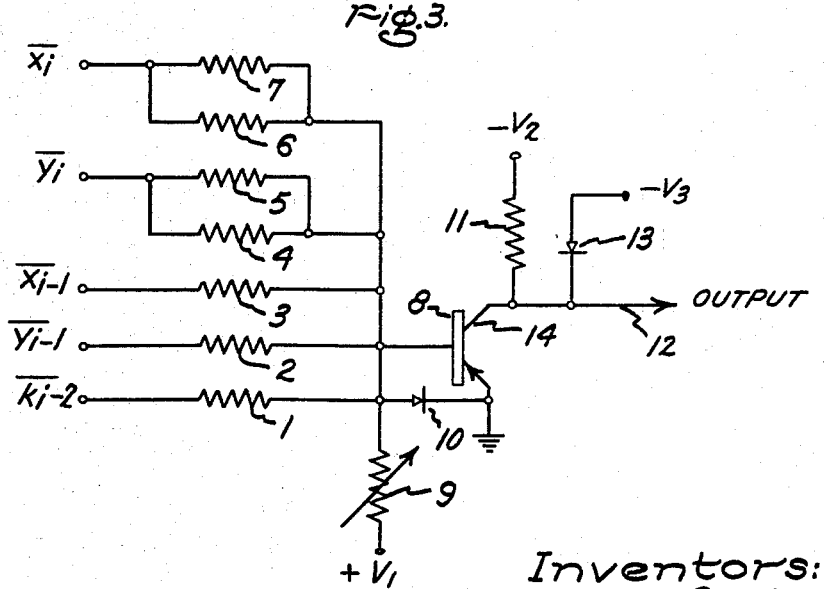
FIG. 3 is a schematic diagram of the threshold gate element of FIG. 2.

An example of a circuit diagram for a typical threshold gate element is illustrated in FIG. 3. The gate illustrated here is inherently a complementing threshold element; that is, a transistor amplifier connected in this manner produces an inverted output. For illustrative purposes, the FIG. 3 threshold gate is taken as an embodiment of the gate shown schematically in FIG. 2, having the same inputs and input weights.

For purposes of the present invention, a non-inverted output when desired may be produced by further including a second inverting transistor amplifier in cascade with the first. Other bistable elements or amplifiers adaptable to employment in threshold circuitry will occur to those skilled in the art, for example, magnetic core, electron tubes, or tunnel diodes.

The circuit illustrated in FIG. 3 produces a negative output voltage, taken as a binary one, when the summation of negative inputs, $\Sigma a_i x_i$, does not exceed the threshold setting. "No output," or a binary zero is produced when the summation of negative inputs, $\Sigma a_i x_i$, exceeds the threshold setting. The circuit comprises a transistor amplifier of grounded emitter configuration having a plurality of equal valued input resistances 1–7 connected between the input terminals and the transistor base 8, which serves as a summing point at which the input signals are added prior to amplification. The voltage on the transistor base, at any given instant, thus represents the sum of all input signals simultaneously applied thereto during this instant. The input signals are taken as negative-going in each instance. The resistances 1–7 have the same ohmic value for individually providing unit weight to negative polarity inputs applied thereto. Thus resistances 1, 2 and 3 provide unit weight for inputs designated $\bar{k}_{i-2}$, $\bar{y}_{i-1}$ and $\bar{x}_{i-1}$. However, resistances 4 and 5, connected in parallel, provide double unit weight to input $\bar{y}_i$, and the parallel combination of resistances 6 and 7 likewise provide double unit weight to $\bar{x}_i$, since a doubled flow of input current may take place through the paralleled resistors in each case.

In the absence of sufficient input for exceeding the threshold, a diode 10 prevents base 8 from rising above ground level, while transistor collector 14, supplied a negative voltage $-V_2$ through resistance 11, is similarly prevented from becoming more negative than a voltage $-V_3$ by means of clamping diode 13. Thus the gate normally supplies a negative output current derived through the diode 13.

A threshold resistance 9, which is made conveniently variable, couples transistor base 8 to a source of positive voltage $V_1$. This resistance is used to determine the threshold of conduction for the transistor. The threshold resistance 9, jointly with input resistances 1–7, comprise a voltage divider having a midpoint at the transistor base 8. In the absence of the prescribed summation of gate inputs required for exceeding the threshold, the voltage drop across threshold resistance 9 is insufficient to lower the transistor base from ground potential. However, when a number of inputs occur exceeding the preset threshold, these inputs collectively provide sufficiently current through their respective input resistances to swing the transistor base below ground and operate the transistor under saturation conditions. At this time, maximum collector-emitter current flows in the transistor establishing a voltage drop across load resistance 11 whereby output terminal 12 rises to a low value near ground level. Thus, the output terminal 12 supplies the voltage equalling minus $V_3$ until the threshold is exceeded, at which time the output voltage rises to near zero. This particular circuit is therefore a complementing threshold circuit as indicated, since an output is produced in the absence of inputs exceeding the gate threshold.

FIG. 4 illustrates the $i^{th}$ stage of an adder in accordance with the present invention, which adds two $i^{th}$ order digits $x_i$ and $y_i$ of two multi-digit numbers $x$ and $y$. In accordance with an important feature of the invention, no carry from the immediately prior stage is required to initiate this stage's carry operation.

This stage is conveniently employed in conjunction with a second and substantially identical stage. The two together then constitute an example of a "grouping" of stages within which the usual carry propagation time is not required; instead, carries are generated substantially simultaneously and independently of one another within the grouping. A complete grouping of this general type is illustrated in FIG. 6, to be described subsequently, while a complete adder is illustrated in FIG. 9, wherein separate blocks indicate separate groupings.

In a grouping of two stages, each of the type illustrated in FIG. 4, two levels of carry can be computed in $t$ seconds, and the sum in $2t$ seconds, $a$ being the operating time for each gate. It follows that an N stage adder, employing such groups of stages, requires $([N/2]+1)t$ seconds for operation, where $[N/2]$ means the smallest integer larger than or equal to $N/2$. A conventional N stage adder requiring carry propagation between each operating stage would have an operating time equal to $Nt$ seconds, or more precisely $(N+1)t$ seconds, i.e. it would operate approximately half as fast.

The adder stage illustrated in FIG. 4 comprises a non-complementing carry gate 15 and a non-complementing sum gate 16. The circuit includes a second carry gate 17 for supplying a non-complemented carry. Each of these gates in the circuit of FIG. 4 is a threshold gate element receiving the inputs as indicated. The whole stage, conveniently designated the $i^{th}$ order stage, produces a sum $s_i$ and a carry $k_i$. An adder stage as illustrated in FIG. 4, viewed individually, requires two time periods, $t$, for its own operation, the first time period for computing the carry and the second time period for computing the sum. Thus during the first time period, $t$, gate 17 produces an output $k_i$ and gate 15 produces an output $\bar{k}_i$, while during a second time period, $t$, gate 16 produces an output $s_i$.

As hereinfore stated, carries for two such stages are produced simultaneously; then the sum for two such stages is produced. It is noted carry gate 15 is supplied with an input $\bar{k}_{i-2}$ from two stages previous, i.e. from another grouping, but does not require a carry from the immediately preceding stage.

In the instance of the FIG. 4 circuit, the sum gate 16 is supplied with an input $k_{i-1}$ from the just previous stage, but as is readily apparent, this input is available at the same time and as soon as input $\bar{k}_i$ is received from carry gate 15.

Sum gate 16 of FIG. 4 having a gap, 3:2 operates in accordance with the following truth table to produce the sum digit $s_i$ corresponding to the pair of digits being added $x_i$ and $y_i$, and carry $k_{i-1}$.

TABLE I

| $x_i$ | $y_i$ | $k_{i-1}$ | $k_i$ | $s_i$ |
|---|---|---|---|---|
| 1 | 1 | 1 | 1 | 1 |
| 1 | 1 | 0 | 1 | 0 |
| 1 | 0 | 1 | 1 | 0 |
| 1 | 0 | 0 | 0 | 1 |
| 0 | 1 | 1 | 1 | 0 |
| 0 | 1 | 0 | 0 | 1 |
| 0 | 0 | 1 | 0 | 1 |
| 0 | 0 | 0 | 0 | 0 |

It is noted the actual inputs to sum gate 16 are $x_i$, $y_i$, $k_{i-1}$, and in addition, $\bar{k}_i$, the latter being the output of carry gate 15. $\bar{k}_i$ is given a weight of two. When $\bar{k}_i$ is present, the presence of $x_i$, $y_i$, or $k_{i-1}$, will produce an output $s_i$ since a net input of three exceeds the gate threshold. However, if a $\bar{k}_i$ signal does not reach sum gate 16, the presence of all three signals $x_i$, $y_i$, and $k_{i-1}$ are needed to produce an output $s_i$. Therefore the output thus produced is in accordance with correct binary logic.

The carry signal $k_i$ provided from carry gate 17, and $\bar{k}_i$ from carry gate 15, are produced as stated without benefit of a propagated carry from an immediately preceding stage. Carry gates 15 and 17 each have a gap of 4:3. From the diagram it is apparent $k_i$ will be produced if both the $i^{th}$ order digits being added, $x_i$, and and $y_i$ are present; each is given a double weight of two, and their simultaneous presence properly dictates a carry—their net presence exceeds the gate threshold. A carry signal is also produced when either $x_i$ or $y_i$ is present, and in addition there is also present $x_{i-1}$ and $y_{i-1}$, the next lower order digits, each given a weight of one, or one of the latter in combination with carry $k_{i-1}$, from two stages previous, given a weight of one.

A carry in the $i^{th}$ stage is thus produced, and the propagation of a carry from the immediately preceding stage is avoided as illustrated, without excessive expenditure of component parts. The additional inputs to the $i^{th}$ carry gate require only an additional input resistance per input.

Carry gate 15 operates in a similar manner. A signal $\bar{k}_i$ for application to the sum gate is produced if both $\bar{x}_i$ and $\bar{y}_i$, each given a weight of two, are present since this combined input exceeds the gate threshold. Likewise either $\bar{x}_i$ or $\bar{y}_i$ and a combination of $\bar{x}_{i-1}$ and $\bar{y}_{i-1}$, each given a weight of one, will indicate a carry by exceeding the threshold. Again, the presence of one of the digits $\bar{x}_i$ or $\bar{y}_i$ and the presence of $\bar{x}_{i-1}$ or $\bar{y}_{i-1}$ plus a carry $\bar{k}_{i-2}$, given a weight of one, derived from two stages previous will dictate $\bar{k}_i$. It should be again noted that no propagated carry is required from an immediately preceding stage in order to produce the carry signal $\bar{k}_i$ for the $i^{th}$ stage of the adder, thus saving approximately half the time conventionally required for carry propagation in an adder circuit. As before, this result is accomplished without multiplying the active components in the circuit, and without excessively multiplying the number of passive components; only an additional resistance is required for each additional input to the carry gate.

As will be appreciated by those skilled in the art, gates 15 and 17 can be consolidated into one threshold gate circuit producing both inverted and non-inverted outputs. The dual gate arrangement is shown herein mainly to facilitate clarity of explanation.

The closest tolerance for the carry gates illustrated in FIG. 4, is derived from the expression $U-L/U+L$, equalling 14 percent, and the speed, as indicated, is $([N/2]+1)t$ seconds, wherein $t$ is the operating time for each threshold gate element. The Boolean expression for carry gate 17 may be given as follows:

$$k_i = [k_{i-2}(x_{i-1}+y_{i-1})+x_{i-1}y_{i-1}](x_i+y_i)+x_iy_i$$

wherein + denotes union (the operation "or") and multiplication denotes intersection (the operation "and"). The expression for carry gate 15 is the complemented version of the same expression. The Boolean expression for sum gate 16 can be written as follows:

$$s_i = k_{i-1}(x_iy_i+\bar{x}_i\bar{y}_i)+\bar{k}_{i-1}(x_i\bar{y}_i+\bar{x}_iy_i)$$

which may be rewritten as:

$$s_i = \bar{k}_i(x_i+y_i+k_{i-1})+x_iy_ik_{i-1}$$

FIG. 5 illustrates an adder stage in accordance with the present invention, employing all complementing threshold elements. This stage is conveniently employed in conjunction with a second substantially identical stage, the two together constituting a group wherein conventional carry propagation time is again not required, since two carries for the two stages are produced simultaneously. The FIG. 5 stage is essentially equivalent to the stage illustrated in FIG. 4, and includes two carry gates 18 and 20 and a sum gate 19. Inasmuch as each gate is a complementing gate, $k_i$ is produced by gate 18 coupled to sum gate 19, while $\bar{k}_i$ is provided as an output from gate 20. In order for the output of gate 19 to be uncomplemented, the weight one inputs applied thereto are $\bar{x}_i$, $\bar{y}_i$ and $\bar{k}_{i-1}$. As indicated, $k_i$ is applied to sum gate 19 with a weight of two.

In FIG. 6, two adder stages are illustrated in combination, constituting an adder grouping according to the present invention, wherein again no carry propagation time is required since two carries, $k_i$ and $\bar{k}_{i+1}$ are computed simultaneously. Thereafter, two sums $s_i$ and $s_{i+1}$ are produced simultaneously. The FIG. 6 embodiment employs both complementing and non-complementing gates and requires only two gates per stage. A first or $i^{th}$ stage for producing a sum $s_i$ includes a carry gate 21 and a complementing sum gate 22. A second or $(i+1)^{th}$ stage for producing the sum $s_{i+1}$ includes a carry gate 23 and a sum gate 24. The grouping of FIG. 6 utilizes combined features from the stages illustrated in FIGS. 4 and 5, and these features therefore will not be redescribed in detail. The grouping of FIG. 6 is provided with carry inputs equalling $\bar{k}_{i-1}$ and $k_{i-2}$, which are available simultaneously from a previous grouping, as well as the digits being added. As well as its sum outputs, this grouping produces carries $k_i$ and $\bar{k}_{i+1}$ as inputs to a next grouping. In an adder composed of plural groupings of this type, sum gates may alternate between complementing and non-complementing types. The FIG. 6 circuit again has a minimum tolerance of 14 percent, attributable to carry gates 21 and 23, and the time of operation for a complete adder composed of such groupings is $([N/2]+1)t$ seconds.

Another embodiment employing two stages per grouping is illustrated in FIG. 7, wherein both complementing and non-complementing gate elements are utilized. In this circuit, as in the circuit of FIG. 6, two carries are generated simultaneously by carry gates 25 and 26, and then two sums $s_i$ and $s_{i+1}$ are produced simultaneously by sum gates 27 and 28. This circuit differs chiefly from FIG. 6 in that carry gate 25 for the lower order or $i^{th}$ stage has a wider component tolerance resulting from its larger gap, 2:1, and also differs in that only one carry, $\bar{k}_{i-1}$, is required as an input from a previous grouping. Only this carry signal and the $i^{th}$ digits $\bar{x}_i$ and $\bar{y}_i$ are applied to carry gate 25. An adder composed of groupings of this type operates in the same time as the previously described circuit grouping.

The circuit groupings hereinbefore described may be generalized as illustrated in FIG. 8 wherein a grouping including $n$ stages is set forth. This circuit computes at approximately $n$ times the speed of conventional adder circuits inasmuch as $n$ carries are computed at one time after which $n$ sums, $s_1$ to $s_n$ are calculated simultaneously. The sum gates are identical to those hereinbefore illustrated. The input summation expression for the $i^{\text{th}}$ order carry gate in the adder, being the $m^{\text{th}}$ order carry gate within such grouping, equals $$\sum_{k=0}^{m-1} 2^{m-k-1}(x_{i-k}+y_{i-d})+k_{i-m}$$

It is observed from the expression that carry gates for groupings above the lowest order (illustrated in FIG. 8), also include as an input the last carry, $k_{i-m}$, from the previous grouping. As should also be noted, each higher order pair of digits applied as inputs to a carry gate receive double the weight of the next lower order pair of digits. The carry from the previous grouping receives the same weight as the lowest order pair of digits applied as inputs to the carry gate.

The gap for each generalized carry gate equals $$U:L = 2^m : 2^m - 1$$

and the tolerance of such gate equals $1/2^{m+1}-1$. In general the threshold is exceeded by a value corresponding to the presence of the pair of highest order digits applied as inputs to said threshold gate, i.e. the $i^{\text{th}}$ order digits as applied to the $i^{\text{th}}$ order carry threshold gate.

FIG. 9 is a block diagram of a complete adder which may be considered to be composed of the generalized circuits of FIG. 8, producing a lowest order set of sum digits $s_1-s_n$ from a first grouping 25 comprised of stages such as illustrated in FIG. 8, a next higher order set of sum digits $s_1'-s_n'$ from a similar grouping 26, and a next higher order set of sum digits $s_1''-s_n''$ from another similar grouping 27. Only carries $k_a$ and $k_b$ consume carry propagation time between groupings.

While it is possible to construct and operate threshold gates having relatively narrow gaps and with relatively tight component tolerances, the employment of gates requiring less stringent component tolerance is frequently desirable. It is still possible to eliminate propagation time over several stages while requiring less stringent gate tolerance if one is willing to employ more than one threshold carry gate per stage. Such circuitry exhibiting wider tolerance is illustrated in FIGS. 10–12. FIG. 10 illustrates one stage of a grouping wherein four carries may be computed simultaneously. The FIG. 10 circuit employs non-complementing threshold gate circuits including a sum gate 25, a principal carry gate 26 and two subcarry gates 27 and 28. This circuit also includes a complementing circuit or inverter 29 for inverting the carry produced by carry gate 26 before application to sum gate 25. Such a circuit may comprise a single transistor amplifier stage. Sum gate 25, producing a sum $s_i$ in the $i^{\text{th}}$ order stage, receives inputs $x_i$, $y_i$ and $k_{i-1}$, each given a weight of one and receives $\bar{k}_i$ having a weight of two. The sum gate operates in the same manner as the sum gates hereinbefore described.

Carry gate 26 receives an input $G_i$, the output of subcarry gate 27, which is given a weight of two, and $H_i$, the output of subcarry gate 28, which also receives a weight of two at carry gate 26. Subcarry gate 27, having a gap, 4:3, receives the two $i^{\text{th}}$ order digits being added, each given a weight of two, and the two $(i-1)^{\text{th}}$ digits, each given a weight of one. Subcarry gate 28, producing the output $H_i$, receives the same inputs but has a gap equalling 3:2. Thus the signal $G_i$ will be produced by gate 27 upon the occurrence of both the $i^{\text{th}}$ order digits being added, or one of these and both the $(i-1)^{\text{th}}$ order digits being added. However the $H_i$ output of subcarry gate 28 will occur at the instance of both of the $i^{\text{th}}$ order digits being added, or one of these and one of the $(i-1)^{\text{th}}$ order digits.

In addition to the subcarry outputs $G_i$ and $H_i$, each given a weight of two, carry gate 26 also receives as inputs signals $H_{i-2}$ and $G_{i-2}$ from subcarry gates two stages previous, each being given a weight of one, as well as unity weighted $k_{i-4}$, the carry from four stages previous which, in this case, consists of the carry propagating from a prior grouping of stages. Carry gate 26 has a gap of 4:3. The Boolean expressions characterizing the foregoing stage may be written as follows:

$$s_i = \bar{k}_i(x_i+y_i+k_{i-1}) + x_iy_ik_{i-1}$$
$$k_i = G_iH_i + (G_i+H_i)[H_{i-2}(G_{i-2}+k_{i-4}) + G_{i-2}k_{i-4}]$$
$$G_i = x_iy_i + (x_i+y_i)x_{i-1}y_{i-1}$$
$$H_i = x_iy_i + (x_i+y_i)(x_{i-1}+y_{i-1})$$

The circuit of FIG. 11 is logically equivalent to that of FIG. 10 and therefore will not be described in detail. This stage employs entirely complemented threshold gates and therefore requires complemented input signals except for carry gate 26a. However since carry gate 26a is a complementing gate, $\bar{k}_i$ will be produced, and again a complementor 29a is inserted between such output and input of sum gate 25a.

FIG. 12 illustrates two stages of an adder grouping employing both complementing and non-complementing gates, it being understood four stages would be employed in a complete grouping. Since both types of gates are employed, no separate complementing elements are required. Again the logical operation is substantially equivalent to that of the FIG. 10 stage with inputs as indicated.

In a complete four stage grouping, employing stages of the type illustrated in FIGS. 10–12, four levels of carry are computed in $t$ seconds after receiving the carry four levels back. The sum is then computed in $t$ additional seconds. Hence a full adder employing such groupings, said adder having a total of N stages, requires an operation time $([N/4]+2)t$ seconds, where $[N/4]$ means the smallest integer larger than or equal to $N/4$. It thus appears such an adder is substantially four times faster than an adder requiring carry propagation throughout. The narrowest gap in the FIGS. 10–12 circuitry is 4:3, permitting a tolerance of 14 percent.

FIG. 13 illustrates four stages of an adder combining features of several previously described circuits. This grouping also achieves a speed of $([N/4]+1)t$ for N stages and requires an average of three complementing or noncomplementing gates per stage. In this circuit, wherein the gates receive the inputs indicated, sum gates 30a through 30d, for the $i^{\text{th}}$ through the $(i+3)^{\text{th}}$ digit positions, are substantially the same as the sum gates hereinbefore described. Likewise carry gates 31a and 31b correspond logically to the carry gates illustrated in FIG. 7. Similarly, carry gate 31d and subcarry gates 32c and 32d are equivalent to carry and subcarry gates of the FIG. 10 circuit. Subcarry gates 32b and 32a, generating the signals $G_{i+1}$ and $H_{i+1}$ for the $(i+1)^{\text{th}}$ digit position, are also equivalent to the subcarry gates of FIG. 10; these gates supply the additional subcarry signals as inputs to carry gate 31d in the $(i+3)^{\text{th}}$ digit position. However the outputs from subcarry gates 32b and 32a, $G_{i+1}$ and $H_{i+1}$, are applied directly to carry gate 31c with the weights of two and one, respectively. Carry gate 31c, having a gap of $\bar{5}:4$, also receives an input $k_{i-1}$ of weight one, as well as the two digits being added in the $(i+2)^{\text{th}}$ digit position, $x_{i+2}$ and $y_{i+2}$, each being given a weight of three. Carry gate 31c produces an output $\bar{k}_{i+2}$ for application to the sum gate 30c.

The circuit of FIG. 13, constituting a full grouping within which no carry propagation time is consumed, computes carries four levels at a time, achieving a speed in an N stage adder as stated of $([N/4]+1)t$ seconds, and a minimum tolerance of 11 percent. This circuit illustrates the fact that various of the hereinbefore described threshold gate circuits and elements according to the present invention may be employed together in varying combinations to produce effective adder circuits wherein carry propagation time is substantially reduced. The Boolean expressions for the FIG. 13 circuits are as follows:

$S_j = \bar{k}_j(x_j + y_j + k_{j-1}) + x_j y_j k_{j-1}$, for $j = i, i+1, i+2, i+3$ $k_i = x_i y_i + x_i k_{i-1} + y_i k_{i-1}$ $k_{i+1} = x_{i+1} y_{i+1} + (x_{i+1} + y_{i+1})(x_i y_i + x_i k_{i-1} + y_i k_{i-1})$ $k_{i+2} = x_{i+2} y_{i+2} + (x_{i+2} + y_{i+2})(G_{i+1} + H_{i+1} k_{i-1})$ $k_{i+3} = G_{i+3} H_{i+3} + (G_{i+3} + H_{i+3})(G_{i+1} H_{i+1}$
$\qquad\qquad\qquad\qquad\qquad + G_{i+1} k_{i-1} + H_{i+1} k_{i-1})$ $G_j = x_j y_j + (x_j + y_j) x_{j-1} y_{j-1}$, for $j = i+1, i+3$ $H_j = x_j y_j + (x_j + y_j)(x_{j-1} + y_{j-1})$, for $j = i+1, i+3$ FIG. 14 illustrates two stages of an adder circuit, which may comprise a two stage grouping, employing 5/2 gates per stage and utilizing gates of all one polarity conversion, here all non-complementing gates. This circuitry computes carries two stages at a time, attaining the speed of $([N/2]+1)t$ seconds for N stages, with a minimum tolerance of 9 percent attributable to sum gate 36 having a gap, 6:5. Carry gate 33 and sum gate 34 constitute a first or $i^{th}$ stage, while carry gate 35 and sum gate 36 constitute an $(i+1)^{th}$ stage. Carry gate 37 provides a carry propagated to the next grouping. The $i^{th}$ stage will be recognized as substantially the same as the $i^{th}$ stage illustrated in FIG. 7. Likewise the carry gate 35 for the $(i+1)^{th}$ stage is the same as that illustrated in the FIG. 7 circuit. Carry gate 37 is equivalent to carry gate 17 in the FIG. 4 circuit. However, sum gate 36 is here altered to attain a circuit grouping employing all the same type gate, i.e. the non-complementing type. This sum gate, 36, receives as one input the output signal, $k_{i+1}$ from carry gate 35, which is given a weight of four. The $(i+1)^{th}$ digits being added are also applied as inputs to sum gate 36, each of these being given a weight of two. The pair of digits from the next lower order digit position, $x_i$ and $y_i$, as well as the carry from a previous grouping $k_{i-1}$, are each coupled as additional inputs to sum gate 36, each with a weight of one. It is appreciated the sum $s_{i+1}$ is produced when the presence of $\bar{k}_{i+1}$ indicates only one of the quantities $x_{i+1}, y_{i+1}$ or $k_i$ is present, while at the same time the presence of $x_{i+1}$ or $y_{i+1}$ may complete the summation of inputs necessary to exceed the threshold. In the absence of either $x_{i+1}$ or $y_{i+1}$, the quantity $k_i$ may provide the additional input for exceeding the threshold in the form of any two of the following: $x_i, y_i$ or $k_{i-1}$. Of course if any two of the quantities $x_{i+1}, y_{i+1}$ or $k_i$ are present, then the threshold will not be exceeded inasmuch as $\bar{k}_{i+1}$ will be absent. However, the threshold will again be exceeded in the presence of all three quantities, $x_{i+1}, y_{i+1}$ and $k_i$. The Boolean expressions for the FIG. 14 circuit are:

$S_i = \bar{k}_i(x_i + y_i) + x_i y_i k_{i-1}$ $S_{i+1} = \bar{k}_{i+1}(x_{i+1} + y_{i+1}) + (k_{i+1} + x_{i+1} y_{i+1})$
$\qquad\qquad\qquad\qquad\qquad\cdot (x_i y_i + x_i k_{i-1} + y_i k_{i-1})$ $\bar{k}_{i+1} = \overline{x_{i+1}} \overline{y_{i+1}} + (\overline{x_{i+1}} + \overline{y_{i+1}})[\overline{x_i y_i} + \overline{x_i k_{i-1}} + \overline{y_i k_{i-1}}]$ $k_{i+1} = x_{i+1} y_{i+1} + (x_{i+1} + y_{i+1})[x_i y_i + x_i k_{i-1} + y_i k_{i-1}]$ An equivalent circuit including all gates of the same polarity conversion, i.e. all complementing gates in this instance, is illustrated in FIG. 15. This circuit is the complementing analog of FIG. 14 and follows directly therefrom, having the same operating time and minimum tolerance. However the circuit of FIG. 15 is of particular interest because the all-complementing gate version is most easily implemented with the transistor circuitry such as hereinbefore described.

From the foregoing it is apparent the present invention provides rapid parallel adding circuitry wherein carry propagation time is reduced to a minimum inasmuch as a plurality of carry signals are computed simultaneously within groupings of adder stages. Moreover, the logic is implemented with a nominal increase in the number of gates and frequently with no increase in the number of gates at all; only an increase in the number of inputs is necessary, requiring but an increase in the number of input coupling resistances.

While we have shown and described several embodiments of our invention, it will be apparent to those skilled in the art that many changes and modifications may be made without departing from our invention in its broader aspects; and we therefore intend the appended claims to cover all such changes and modifications as fall within the true spirit and scope of our invention.

What we claim as new and desire to secure by Letters Patent of the United States is:

1. An adder comprising a plurality of stages for generating the sum of two numbers from the lowest order level digit to the highest order level digit respectively, the $i^{th}$ one of said stages summing a pair of digits $x_i$ and $y_i$ to produce a sum $s_i$ and including a carry producing threshold means receiving a plurality of input signals and producing a carry output signal $k_i$, means coupling the ouput of said $i^{th}$ stage, carry producing threshold means to the input of the $(i+1)^{th}$ stage, said $i^{th}$ stage carry producing threshold means having a threshold value in the gap $U:L = 2^m : 2^m - 1$, wherein U is the smallest total value of input signals for which the threshold is exceeded, L is the largest total value of input signals for which the threshold is not exceeded, and m is the order of the $i^{th}$ stage within a predetermined grouping of said stages, said carry producing threshold means implementing inputs from the $i^{th}$ and lower order stages according to the expression, $$\sum_{k=0}^{m-1} 2^{m-k-1}(x_{i-k} + y_{i-k}) + k_{i-m}$$

2. An adder including a plurality of stages for generating the sum of two numbers, each of said numbers including corresponding $x$ and $y$ digits in a plurality of order levels from lower order to higher order respectively, each said stage in any order level position $i$ comprising a sum threshold gate responsive to a carry digit signal $k_{i-1}$ received from the $(i-1)^{th}$ stage and producing a sum digit signal $s_i$, and a carry threshold gate responsive to a carry digit signal $k_{i-2}$ received from the $(i-2)^{th}$ stage and producing a carry digit signal $k_i$, said $i^{th}$ order level stage output signals being characterized by the following Boolean expressions:

$s_i = \bar{k}_i(x_i + y_i + k_{i-1}) + x_i y_i k_{i-1}$ and $k_i = [k_{i-2}(x_{i-1} + y_{i-1}) + x_{i-1} y_{i-1}](x_i + y_i) + x_i y_i$ 3. An adder including a plurality of stages for generating the sum of two numbers, each of said numbers including corresponding $x$ and $y$ digit signals in a plurality of order levels from lower order to higher order respectively, each said stage in any order level position $i$ comprising a sum threshold gate responsive to a carry digit signal $k_{i-1}$ received from the $(i-1)^{th}$ stage and producing a sum digit signal $s_i$, first and second subcarry threshold gates producing subcarry digit signals $G_i$ and $H_i$ respectively, and a carry threshold gate responsive to subcarry digit signals $G_{i-2}$ and $H_{i-2}$ received from the $(i-2)^{th}$ stage and responsive further to a carry digit signal $k_{i-4}$ received from the $(i+4)^{th}$ stage, said carry threshold gate coupling said subcarry threshold gates to said sum threshold gate and producing a carry digit signal $k_i$, said $i^{th}$ stage threshold gate output signals being characterized by the following Boolean expressions:

$$s_i = \bar{k}_i(x_i + y_i + k_{i-1}) + x_i y_i k_{i-1}$$

$$k_i = G_i H_i + (G_i + H_i)[H_{i-2}(G_{i-2} + k_{i-4}) + G_{i-2}k_{i-4}]$$

$$G_i = x_i y_i + (x_i + y_i)x_{i-1}y_{i-1}$$

and $$H_i = x_i y_i + (x_i + y_i)(x_{i-1} + y_{i-1})$$

4. An adder comprising a plurality of stages for generating the sum of two numbers, each of said numbers including corresponding digits from lower order level to higher order level respectively, each said stage including a sum threshold gate producing a sum digit signal, a carry threshold gate producing a carry digit signal, first signal weighting means coupled to the input of said carry threshold gate and additively applying thereto signals responsive to the pair of digits of the corresponding order level being added, and second signal weighing means coupled to the input of said carry threshold gate and additively applying thereto signals responsive to at least one further pair of digits of lower order level, said first and second signal weighting means supplying higher weight to the higher order level digit signals than to the lower order level digit signals.

5. The adder of claim 4 including means coupling the output of the carry threshold gate of the next lower order level stage to the input of said sum threshold gate.

6. The adder of claim 5 wherein said each stage further includes a second carry threshold gate responsive to signals corresponding to complements of each of said pairs of digits, and means coupling the output of said second carry threshold gate to the input of said sum threshold gate.

7. The adder of claim 5 including third signal weighting means coupling the output of said carry threshold gate of the second lower order level stage to the input of the carry threshold gate of said each stage, said third signal weighting means supplying to signals conducted therein a weight equal to that supplied by said second signal weighting means to said lower order level digit signals.

8. An adder comprising a plurality of stages for generating the sum of two numbers, each of said numbers including corresponding digits from lower order to higher order respectively, each said stage producing a signal representing a carry in any order level digit position $i$ and including a threshold gate, first signal weighting means coupled to the input of said gate for additively applying thereto signals corresponding to a pair of $i^{th}$ order digits to be added and a further pair of digits of next successive lower order $(i-1)$, said first signal weighing means supplying to the signals corresponding to the pair of $i^{th}$ order digits double the weight of the signals corresponding to the $(i-1)^{th}$ order digits, and second signal weighting means coupled to the input of said threshold gate for additively applying thereto a carry signal from a stage of order $(i-2)$ with as low a weight as said $(i-1)^{th}$ order digits, said threshold gate having a threshold level exceeded by presence of signals corresponding to said $i^{th}$ order pair of digits.

9. In an adder having a plurality of stages for generating the sum of two numbers, each of said numbers including digits from lower order to higher order respectively, a circuit for providing a signal representing a carry in any order level digit position $i$, said circuit comprising a first carry threshold gate having a plurality of inputs, first and second subcarry threshold gates, first signal weighting means couping the outputs of said first and second subcarry threshold gates to predetermined inputs of said first carry threshold gate and weighting output signals of said first and second subcarry threshold gate applied to said first carry threshold gate at a predetermined value, second signal weighting means coupled to inputs of said subcarry threshold gates for applying thereto signals corresponding to the digits being added in the $i^{th}$ and $(i-1)^{th}$ order level positions and weighting signals corresponding to the digits being added in the $(i-1)^{th}$ order level position below said predetermined value, and third signal weighting means coupling outputs of subcarry threshold gates in the $(i-2)^{th}$ order level position and a carry threshold gate in the $(i-4)^{th}$ order level position to remaining inputs of said first carry threshold gate and weighting signals provided by said lower order subcarry threshold gates below said predetermined value.

10. The circuit of claim 9 including a sum threshold gate producing an output sum signal corresponding to the $i^{th}$ order digits being added, and means coupling the output of said first carry threshold gate to said sum threshold gate, said sum threshold gate being responsive to signals corresponding to the $i^{th}$ order digits being added and the $i^{th}$ and $(i-1)^{th}$ order carry digits.

11. In an adder including a plurality of stages for generating the sum of two numbers each of said numbers including corresponding digits from lower order to higher order respectively, a cicuit for producing signals representing a sum and a carry in any order level digit position $i$, said circuit comprising: first threshold means having a plurality of inputs and producing a carry signal in the $i^{th}$ order level digit position; first signal weighting means additively applying signals to inputs of said first threshold means corresponding to a pair of $i^{th}$ order level digits, at least one pair of lower order level digits, and a carry from the second lower order level, said first signal weighting means providing lower weighting to the lower order level digits of said pairs and to the carry from the second lower order level than to the higher order level digits of said pairs; second threshold means having a plurality of inputs and producing a sum signal in the $i^{th}$ order level digit position; second signal weighting means additively applying signals to inputs of said second threshold means corresponding to said pair of $i^{th}$ order level digits, the next lower order level pair of digits, said carry from the second lower order level, and the inverse of said carry for the $i^{th}$ order level digit position, said second signal weighting means providing highest weighting to the inverse of the carry in the $i^{th}$ order level digit position, next highest weighting to the $i^{th}$ order level pair of digits, and lowest weighting to the remaining input signals to said second threshold means.

12. In an adder having a plurality of stages for generating the sum of two numbers, each of said numbers including corresponding digits from lower order to higher order respectively, a circuit for providing a signal representing a carry in any order level digit position $i$, said circuit comprising: a carry threshold gate having a plurality of inputs; first, second, third and fourth subcarry threshold gates; means coupling the outputs of said first and second subcarry threshold gates to first and second inputs of said carry threshold gate respectively; first signal weighting means additively applying input signals to each of said first and second subcarry threshold gates corresponding to the digits added in the $(i-1)^{th}$ and $(i-2)^{th}$ order level positions, said first signal weighting means providing lower weighting for the digits added in the $(i-2)^{th}$ order level position than for the digits added in the $(i-1)^{th}$ order level position; means coupling the outputs of said third and fourth subcarry threshold gates to third and fourth inputs said carry threshold gate respectively; second signal weighting means additively applying input signals to each of said third and fourth subcarry threshold gates corresponding to the digits added in the $i^{th}$ and $(i+1)^{th}$ order level positions, said second signal weighting means providing lower weighting for the digits added in the $i^{th}$ order level position than for the digits added in the $(i+i)^{th}$ order level position; and means applying a signal to a fifth input of said carry threshold gate, said signal corresponding to a carry from the $(i-3)^{th}$ order level position; each of said inputs to said carry threshold gate including further signal weighting means providing the highest weighting to signals applied to said third and fourth inputs of said carry threshold gate and lower equal weightings to signals applied to said first, second and fifth inputs of said threshold gate.

13. An adder having a plurality of stages for generating the sum of two numbers, each of said numbers including corresponding digits to be added in a plurality of order levels from lower order to higher order respectively, each pair of adjacent order level stages comprising: first and second sum threshold gates producing sum digit signals; first and second carry threshold gates coupled to said first and second sum threshold gate respectively and supplying carry digit signals thereto; means applying a signal corresponding to a respective digit of a pair of digits to be added to each of said first and second sum threshold gates respectively with predetermined weight less than said carry digit signals; means applying the inverse of said signal corresponding to a respective digit of a pair of digits to be added to each of said first and second carry threshold gate respectively with predetermined weight; means applying a carry digit signal from a lower order level stage to said first and second sum threshold gates; and means applying the inverse of the carry digit signal from said lower order level stage to said first and second carry threshold gates.

References Cited by the Examiner

UNITED STATES PATENTS

| | | | |
|---|---|---|---|
| 2,966,305 | 12/1960 | Rosenberger | 235—175 |
| 3,043,511 | 7/1962 | Scott | 235—176 |
| 3,113,206 | 12/1963 | Harel | 235—175 |
| 3,148,274 | 9/1964 | Davis | 235—175 |
| 3,202,806 | 8/1965 | Menne | 235—173 |

MALCOLM A. MORRISON, *Primary Examiner.*

M. J. SPIVAK, *Assistant Examiner.*